United States Patent
Oshima et al.

(10) Patent No.: US 7,274,478 B2
(45) Date of Patent: Sep. 25, 2007

(54) IMAGE PRINTING APPARATUS AND IMAGE PRINTING CONTROL METHOD

(75) Inventors: Masato Oshima, Kanagawa (JP); Tetsuya Kawanabe, Kanagawa (JP); Takao Aichi, Tokyo (JP); Akihiko Hamamoto, Kanagawa (JP); Kazuyuki Masumoto, Kanagawa (JP); Fumihiro Goto, Kanagawa (JP); Makoto Hibi, Kanagawa (JP); Tetsuya Suwa, Kanagawa (JP); Mitsuhiro Ono, Tokyo (JP)

(73) Assignee: CanonKabushiki Kaisha, Tokyo (JP)

( * ) Notice: Subject to any disclaimer, the term of this patent is extended or adjusted under 35 U.S.C. 154(b) by 953 days.

(21) Appl. No.: 10/444,991

(22) Filed: May 27, 2003

(65) Prior Publication Data
US 2003/0227648 A1 Dec. 11, 2003

(30) Foreign Application Priority Data
Jun. 5, 2002 (JP) ............................ 2002-164623

(51) Int. Cl.
*B41B 1/00* (2006.01)
*G06F 15/00* (2006.01)

(52) U.S. Cl. .................... 358/1.15; 358/1.16; 358/3.23; 358/1.9; 358/1.2; 358/302; 396/322; 396/332

(58) Field of Classification Search ................. 358/1.9, 358/1.15, 302, 1.16, 3.23, 1.2; 396/322, 396/332
See application file for complete search history.

(56) References Cited

U.S. PATENT DOCUMENTS

| | | | |
|---|---|---|---|
| 5,710,931 A | 1/1998 | Nakamura et al. | 395/760 |
| 5,811,890 A | 9/1998 | Hamamoto | 507/66 |
| 5,870,535 A | 2/1999 | Duffin et al. | 395/115 |
| 6,104,886 A | 8/2000 | Suzuki et al. | 396/429 |
| 6,195,513 B1* | 2/2001 | Nihei et al. | 396/332 |
| 6,356,357 B1 | 3/2002 | Anderson et al. | 358/1.17 |
| 7,130,073 B2* | 10/2006 | Kumar et al. | 358/1.16 |
| 2002/0021458 A1 | 2/2002 | Saito et al. | 358/515 |
| 2002/0063898 A1 | 5/2002 | Goto et al. | 358/3.01 |
| 2002/0158934 A1 | 10/2002 | Oshima | 347/19 |

FOREIGN PATENT DOCUMENTS

| | | |
|---|---|---|
| EP | 0 859 326 | 8/1998 |
| EP | 1 119 177 | 7/2001 |
| JP | 10-164330 | 7/1998 |
| JP | 10-262249 | 9/1998 |
| JP | 2002-125116 | 4/2002 |
| KR | 1998-086978 | 12/1998 |

\* cited by examiner

*Primary Examiner*—King Y. Poon
*Assistant Examiner*—Quang N. Vo
(74) *Attorney, Agent, or Firm*—Fitzpatrick, Cella, Harper & Scinto

(57) ABSTRACT

A print-direct printer for receiving and printing JPEG data from a DSC divides the area of a memory into a plurality of blocks, stores the received JPEG data in the memory on a block-by-block basis and decompresses the compressed JPEG data that has been stored in the memory, thereby expanding the JPEG data into image data. If it is determined that JPEG data to be expanded next has not been stored in the memory, then the DSC is requested for JPEG data corresponding to at least one block, in an amount that is less than the maximum amount of data transferable from the DSC, in addition to the JPEG data to be expanded.

12 Claims, 12 Drawing Sheets

IMAGE PRINTING APPARATUS AND IMAGE PRINTING CONTROL METHOD

FIELD OF THE INVENTION

This invention relates to an image printing apparatus for printing input image data, which has been captured by, e.g., a digital camera, on a printing medium, and to a method of controlling such printing.

BACKGROUND OF THE INVENTION

Digital cameras (image sensing devices) capable of capturing an image and converting the captured image to digital data through a simple operation have become widespread in recent years. When an image that has been captured by such a camera is printed as a photograph, the general practice is to load the digital image data representing the captured image into a personal computer temporarily, subject the data to image processing in the personal computer and then output the processed image data to a color printer, which proceeds to print the image.

Color printing systems and so-called print-direct (PD) printers have been developed recently. In a color printing system, an image can be printed by sending the digital image data directly from a digital camera to a color printer without the intermediary of a personal computer. In a PD printer, a memory card that has been inserted into a digital camera and stores captured images is inserted directly into a color printer, which proceeds to print the captured images that have been stored on the memory card.

Image data that has been stored in a digital camera generally is compressed according to the JPEG standard. The above-mentioned PD printer accepts the compressed image data as an input, stores the data in a buffer and then prints the data upon expanding it. As for means for achieving expansion in a case where compressed image data is input and then expanded and printed, see the specification of Japanese Patent Application Laid-Open No. 10-262249 "Method and Apparatus for Expanding Compressed Image Data", by way of example. According to the disclosure, image data is extracted in MCUs (Minimum Coded Units) in an order other than that in which the data was stored as compressed image data. Use of this method is advantageous in that it is possible to reduce the memory size needed for image-data expansion processing without requiring the provision of one frame's worth of an image output buffer. That the disclosed invention will be effective is premised on a certain requisite, namely that the data read-out speed be sufficiently high. The reason for this is that if a sufficiently high access speed is attained, the speed at which image data is expanded and output will be little affected even though access to data on an MPU basis is performed frequently.

With the example of the prior art described above, however, the fact that access to image data in minimum coded units occurs frequently means that if the reading and seeking of image files and the like cannot be performed at high speed, then it will take too much time to achieve the printing of the image data. In other words, compressed image data is read once prior to expansion processing, coded-bit length information is obtained for every MCU in one frame and processing for expanding the compressed image is executed in minimum coded units in a predetermined order. As a consequence, access to the image data occurs randomly from the beginning to the end of the image data. Further, if the size of the image data exceeds the memory size of the PD printer, the final portion of the image data cannot be buffered merely by performing buffering from the beginning of the image data. When the part of the image data that exceeds the size of the buffer memory is printed, therefore, it becomes necessary to access the camera further in order to request and acquire the data needed. The effects of slow access speed become conspicuous.

This problem will be described in greater detail with reference to FIGS. 11 and 12.

FIG. 11 is a diagram illustrating the area (hatched portion) of an image memory in which image data exists in a case where JPEG data compressed in the order of raster scanning has been received in this order and expanded into an image. As shown in FIG. 11, image data that has been expanded into an image is such that length in the horizontal direction differs for each image. In order to limit the memory capacity of the printer and hold down product cost, the memory capacity of the image memory is set to be less than the capacity that is capable of storing all of the image data. In FIG. 11, the portion indicated at numeral 10000 is assumed to be the area in which data is capable of being stored in the image memory.

Further, in order to make it possible to print out a larger image while reducing the size of the apparatus by narrowing the range over which the printhead is scanned, use is made of a method of the kind shown in FIG. 11 in which the image is printed at right angles to a portrait-oriented image.

Accordingly, when image data indicated at 11000 is stored and expanded in the raster order, i.e., in the order of JPEG data, as shown in FIG. 12, the portion indicated at 11001 fits in the memory capacity of the image memory but the portion indicated at 11002 extends beyond this capacity and will not be stored. Since the scanning direction of the carriage (printhead) is vertical, the data portion indicated at 11004 within the data portion (the hatched portion: 11003+11004) printed by the initial scan of the printhead will not have been stored in the image memory. Owing to such print scanning, it becomes necessary to request the digital camera for the JPEG data that corresponds to the portion 11004 and to expand the image by acquiring and decoding this JPEG data. Such processing lengthens the time needed to print image data and results in an apparatus that is very difficult for the user to use.

SUMMARY OF THE INVENTION

Accordingly, a feature of the present invention is to efficiently acquire and store image data, which is obtained from an image sensing device, in a memory and shorten the time needed to print the image by reducing the number of times image data is transferred from the image sensing device.

A further feature of the present invention is to store image data efficiently and reduce the number of times image data is transferred, even in the case of a small-capacity memory, thereby making it possible to reduce the time needed to print the image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DESCRIPTION OF THE PREFERRED EMBODIMENT

A preferred embodiment of the present invention will now be described with reference to the accompanying drawings.

Figure 1:
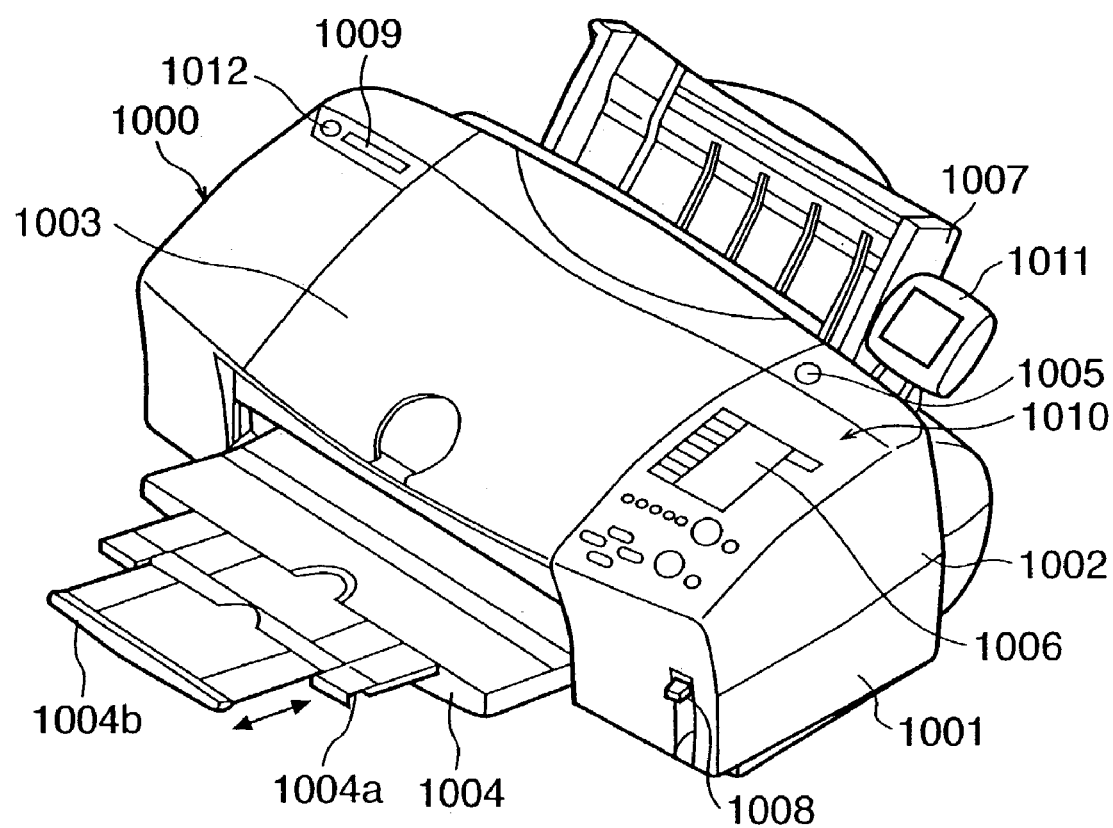
FIG. 1 depicts a perspective view of a PD printer according to an embodiment of the present invention.

FIG. 1 depicts a perspective view of a PD printer 1000 according to this embodiment of the present invention. The PD printer 1000 functions as an ordinary personal-computer printer for receiving and printing data from a host computer (personal computer), and as a printer for directly reading and printing image data that has been stored on a storage medium such as a memory card or for receiving and printing image data from a digital camera.

The main body constituting the shell of the PD printer 1000 of this embodiment has a lower case 1001, an upper case 1002, an access cover 1003 and a discharge tray 1004. The lower case 1001 forms the approximate lower half of the PD printer 1000 and the upper case 1002 the approximate upper half. A hollow structure having a storage space for internally accommodating mechanisms described later is constructed by combining the upper and lower cases, and the top and front sides of the structure are formed to have respective openings. The discharge tray 1004 has one edge thereof retained pivotally on the lower case 1001 and is so adapted as to open and close the opening, which has been formed in the front side of the lower case 1001, by being rotated forward and backward. When a printing operation is performed, therefore, the discharge tray 1004 is rotated forward to open the front opening, thereby making it possible to eject printed sheets from this opening and to successively stack the printed sheets. Further, the discharge tray 1004 accommodates two auxiliary trays 1004a and 1004b. When necessary, each tray can be pulled forward so that the paper supporting area can be increased or decreased in three stages.

The access cover 1003 has one edge thereof pivotally retained on the upper case 1002 so as to be capable of opening and closing the opening formed in the top of the printer main body. Opening the access cover 1003 makes it possible to replace a printhead cartridge (not shown) or ink tank (not shown) accommodated within the main body. Though not particularly shown, opening the access cover 1003 causes a projection formed on the inner side thereof to turn a cover open/close lever. By detected the level rotation position by a microswitch or the like, the open/closed state of the access cover can be sensed.

The top side of the upper cover 1002 is provided with a power key 1005. A control panel 1010 having a liquid crystal display 1006 and various key switches is provided on the right side of the upper cover 1002. The structure of the control panel 1010 will be described in detail later with reference to FIG. 2. An automatic feeder 1007 feeds printing sheets into the main body of the printer automatically. A paper selection level 1008 is a lever for adjusting the clearance between the printhead and printing sheets. A card slot 1009 receives an inserted adapter that is for loading and unloading a memory card. Image data that has been stored on the memory card can be directly loaded and printed via this adapter. A compact flash memory, smart media and memory stick, etc., are examples of the memory card. A viewer (liquid crystal display) 1011 is capable of being removably attached to the main body of the PD printer 1000. The viewer 1011 is used to display images frame by frame or index images as in a case where images desired to be printed are searched from images that have been stored on the memory card. A USB terminal 1012 is for connecting a digital camera, described later. The back side of the PD printer 1000 is provided with a USB connector for connecting a personal computer (PC).

Figure 2:
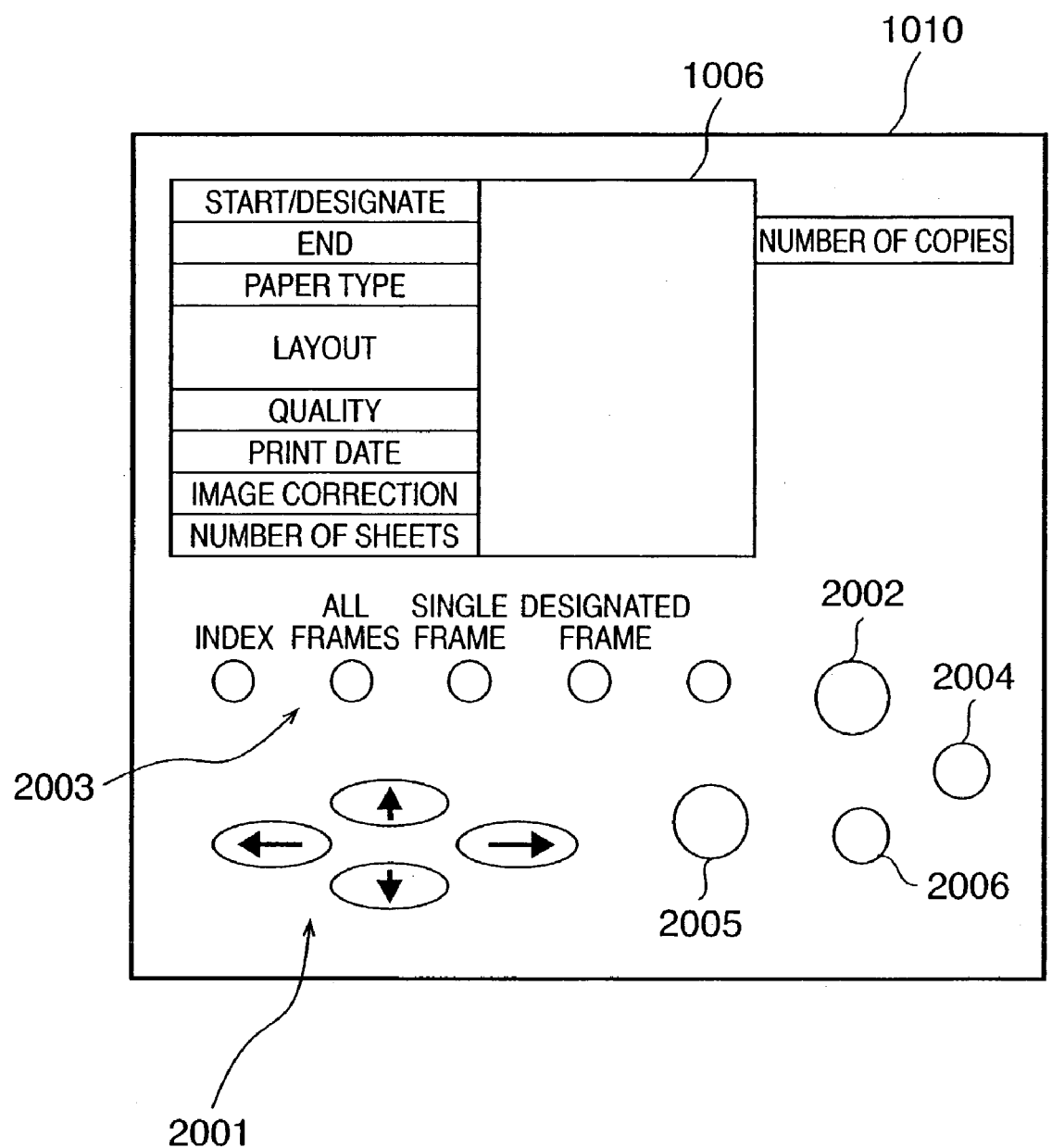
FIG. 2 depicts an external view of a control panel on the PD printer according to this embodiment.

FIG. 2 depicts an external view of the control panel 1010 on the PD printer 1000 according to this embodiment.

The liquid crystal display 1006 displays menu items for setting various data relating to items being printed. Items displayed include a starting photograph number and designated frame number of a range desired to be printed (start command designation/print frame designation); final photograph number of the range for which printing has been completed (end); number of copies to be printed (number of copies); type of paper (printing sheet) used in printing (paper type); set number of photographs to be printing on one sheet of paper (layout); designation of printing quality (quality); designation as to whether date of photography is to be printed out (print date); designation as to whether a photograph is to be printed upon application of a correction (correct image); and display of number of sheets of paper used in printing (number of sheets). These items are selected or specified using a cursor key 2001. Whenever a mode key 2002 is pressed, printing type (index printing, printing of all frames, printing of a single frame, etc.) is changed over and a corresponding LED of LEDs 2003 is lit accordingly. A maintenance key 2004 is for performing printer maintenance, such as cleaning of the printhead and maintenance of the printer. A print start key 2005 is pressed when start of printing is specified or when setting up maintenance. A print stop key 2006 is pressed when printing is stopped and when halting of maintenance is specified.

The arrangement of main components relating to control of the PD printer 1000 according to this embodiment will now be described with reference to FIG. 3. Components identical with those shown in the above-mentioned drawings are designated by like reference characters and need not be described again.

Figure 3:
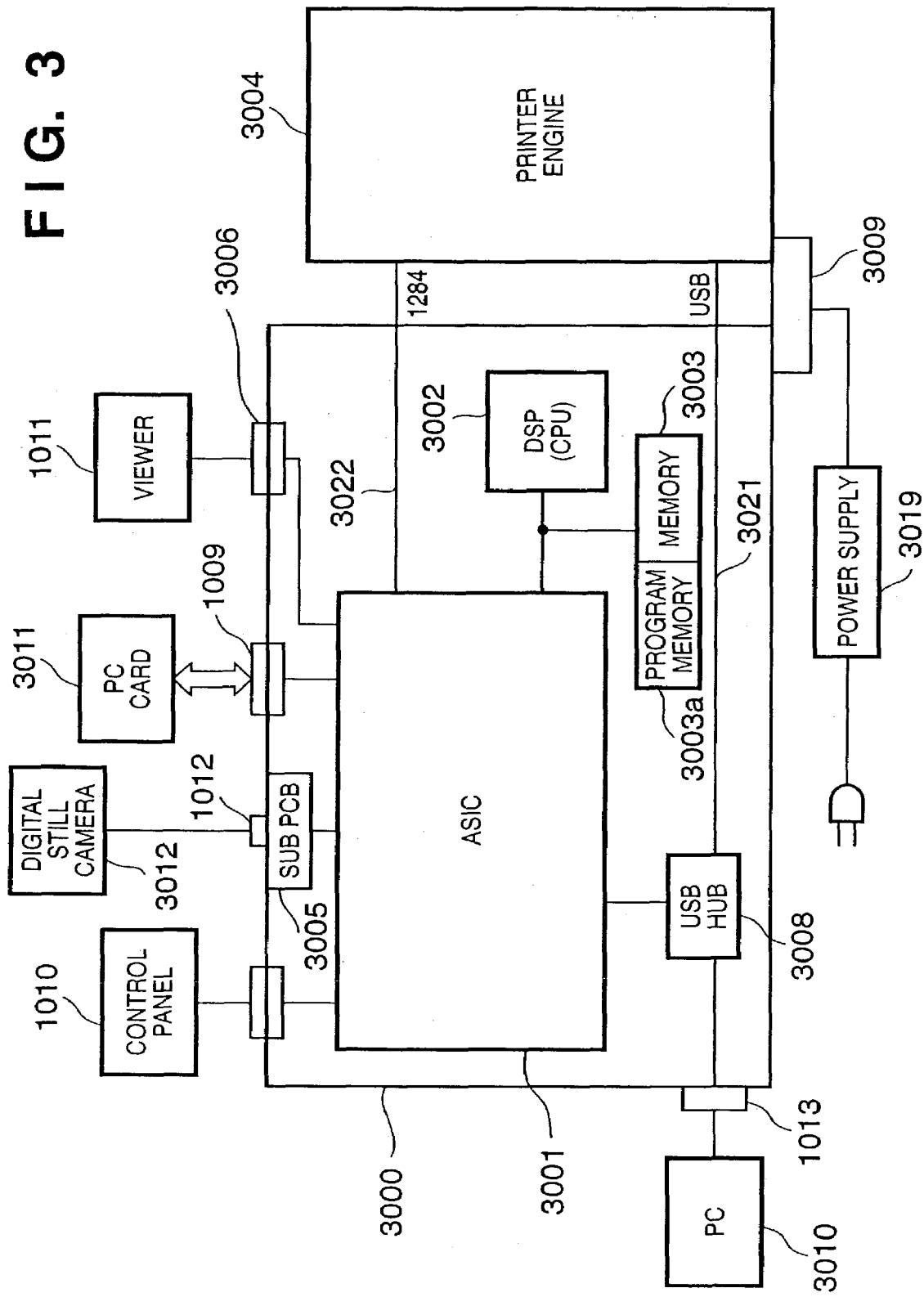
FIG. 3 is a block diagram illustrating the arrangement of main components relating to control of the PD printer according to this embodiment.

FIG. 3 illustrates a controller (control board) 3000. The controller 3000 includes an ASIC (a special-purpose customized LSI chip) the structure of which will be described later with reference to the block diagram of FIG. 4. A DSP (digital signal processor) 3002 has an internal CPU for executing various control processing, described later, and image processing such as conversion of a luminance signal (RGB) to a density signal (CMYK), smoothing, gamma conversion and error diffusion, etc. A memory 3003 has a program memory 3003a for storing the control program of the CPU in the DSP 3002, and a memory area that functions as a RAM area for storing a program at the time of execution and a work area for storing image data. A printer engine 3004 is that of an inkjet printer for printing a color image using color inks of a plurality of colors. A USB connector 3005 serves as a port for connecting a digital still camera (DSC) 3012. A connector 3006 is for connecting the viewer 1001. The controller 3000 further includes a USB hub 3008. When the PD printer 1000 prints based upon image data from the personal computer 3010, the USB hub 3008 allows the data from the personal computer 3010 to pass through as is and outputs this data to the printer engine 3004 via the USB 3021. As a result, the connected personal computer 3010 is capable of executing printing by exchanging data and signals directly with the printer engine 3004 (i.e., the personal computer 3010 functions as an ordinary personal computer). A power-supply connector 3009 inputs DC voltage, which has been converted from commercial AC, from a power supply 3019. The personal computer 3010 is an ordinary personal computer. Numerals 3011 and 3012 denote the aforementioned memory card and digital still camera, respectively.

It should be noted that the exchange of signals between the controller 3000 and printer engine 3004 is carried out via the USB 3021 or a bus 3022 that is compliant with IEEE 1284.

Figure 4:
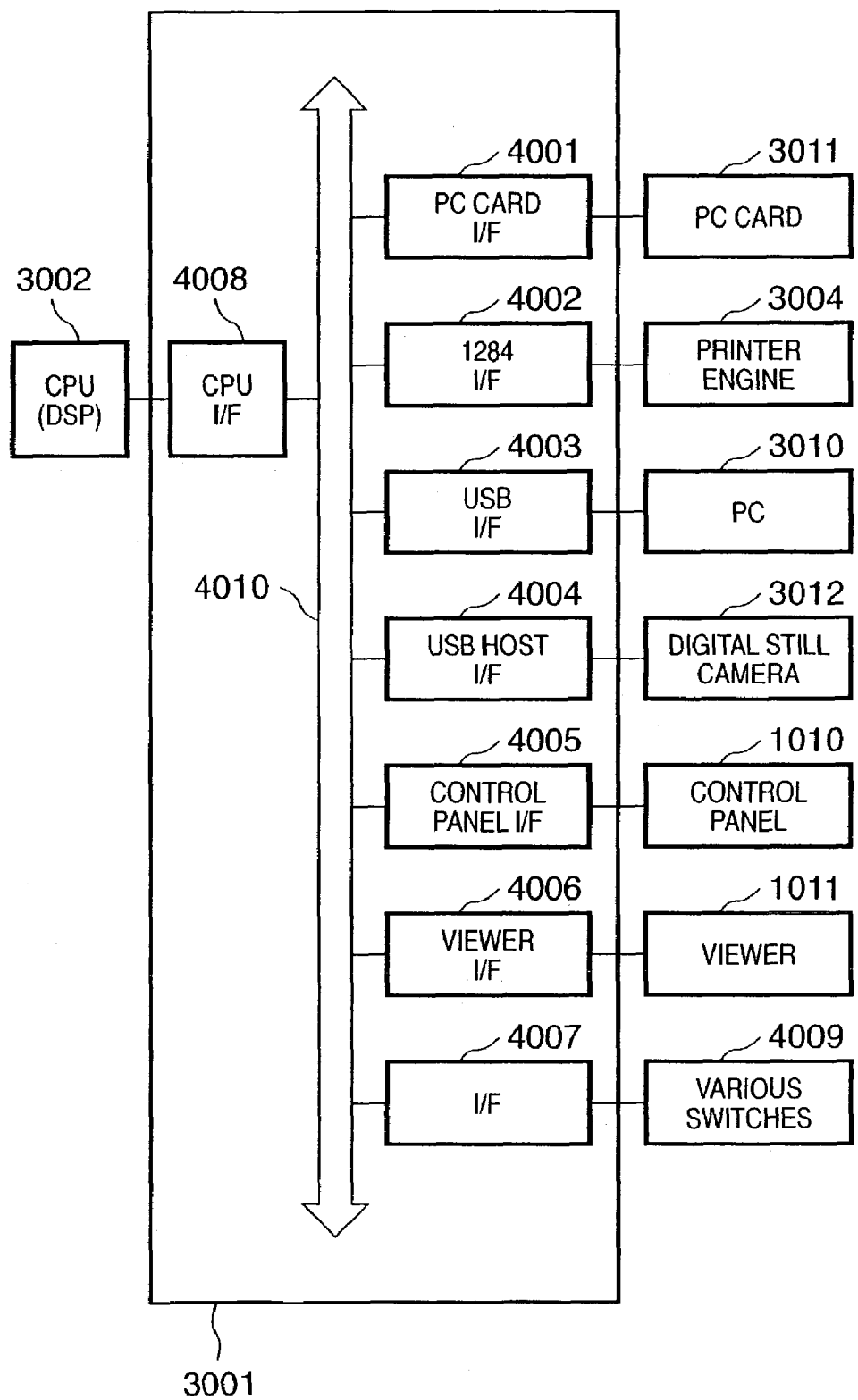
FIG. 4 is a block diagram illustrating the structure of an ASIC in the PD printer according to this embodiment.

FIG. 4 is a block diagram illustrating the structure of the ASIC 3100. Components in FIG. 4 identical with those shown in the foregoing drawings are designated by like reference characters and need not be described again.

A memory-card interface 4001 reads image data that has been stored on an inserted memory card 3011 and writes data to the memory card 3011. An IEEE-1284-compliant interface 4002 is for exchanging data with the printer engine 3004. The IEEE-1284-compliant interface 4002 is a bus used in a case where image data that has been stored in the digital still camera 3012 or memory card 3011 is printed. Other interfaces are a USB interface 4003 for exchanging data with the personal computer 3010; a USB host interface 4004 for exchanging data with the digital still camera 3012; a control-panel interface 4005 for inputting various operating signals from the control panel 1010 and outputting display data to the liquid crystal display 1006; a viewer interface 4006 for controlling the display of data on the viewer 1011; an interface 4007 for controlling interfacing with various switches and LEDs 4009, etc., and a CPU interface 4008 for controlling the exchange of data with the DSP 3002. An internal bus (ASIC bus) 4010 interconnects the above-mentioned interfaces.

Figure 5:
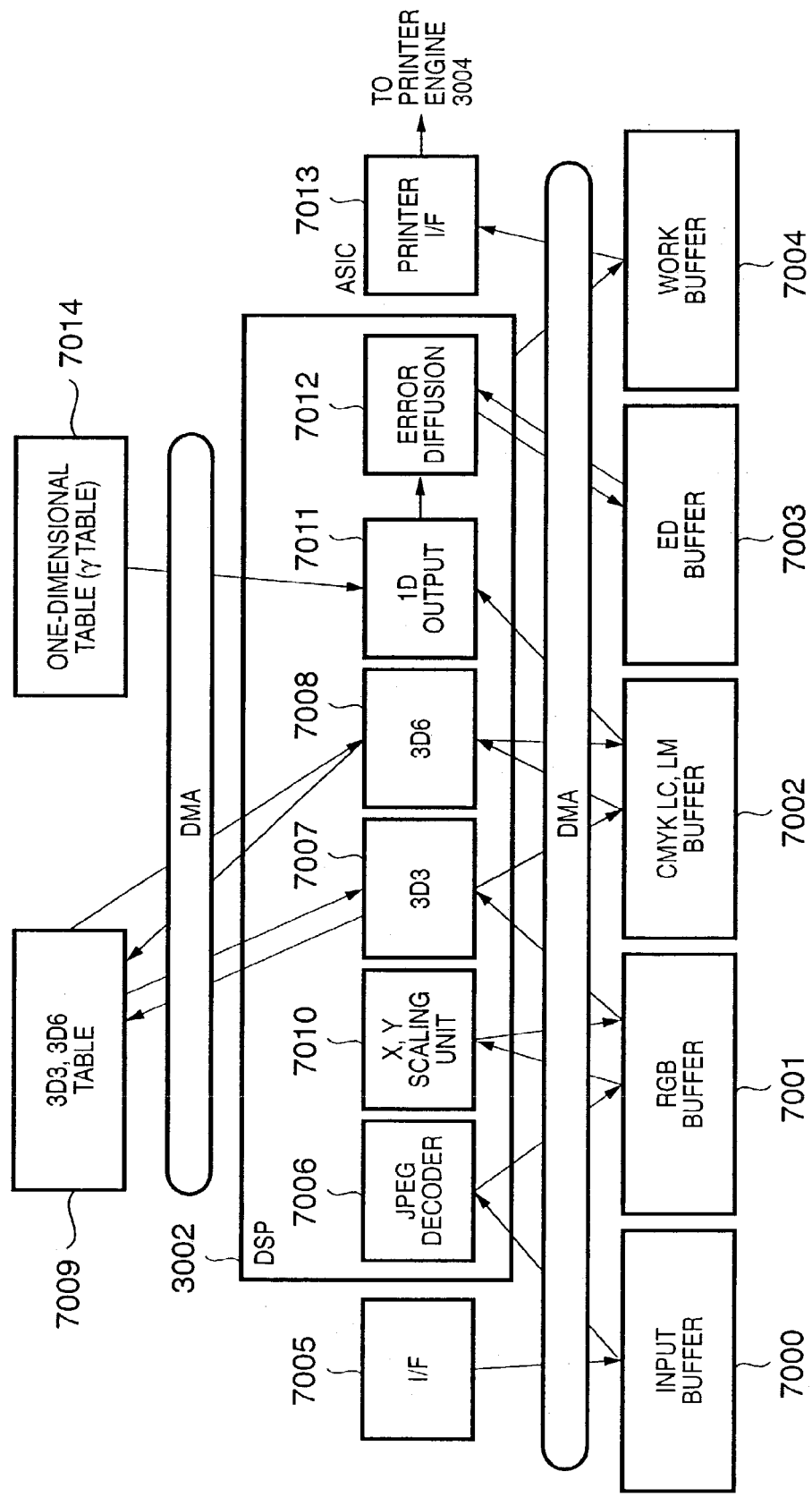
FIG. 5 is a functional block diagram illustrating the functional structure relating to image processing control in a PD printer according to this embodiment.

FIG. 5 is a functional block diagram illustrating, in greater detail, the functional structure relating to image processing control in the PD printer 1000 according to this embodiment. Components in FIG. 5 identical with those shown in the foregoing drawings are designated by like reference characters and need not be described again.

Image data or JPEG-compressed image data from the memory card 3011, camera 3012 or personal computer 3010, which data has entered via an interface 7005 such as a USB bus interface, is stored temporarily in an input buffer 7000. If the image data is compressed data, it is decompressed by a JPEG decoder 7006, Y, Cb, Cr signals are converted to R, G, B signals and the RGB data is stored in an RGB buffer 7001. The JPEG decoder 7006 decodes the JPEG data at the time of printing and expands it into image data, at which time it repeatedly executes processing for requesting the input buffer 7000 for JPEG data to be decoded next in the raster order conforming to the order in which printing is performed, acquires the requested JPEG data, decodes the data and stores the decoded data in the RGB buffer 7001. An X, Y scaling unit 7010 converts the X- or Y-direction size of the image data that has been stored in the RGB buffer 7001. A 3D3 7007 converts the color space of the RGB data by referring to a look-up table 7009. A 3D6 7008 converts the RGB signal to a 6-color signal, namely C, M, Y, K, LC (light cyan) and LM (light magenta) signals, by referring to the look-up table 7009. A 1D output unit 7011 executes color processing such as a gamma conversion by referring to a one-dimensional table 7014. An error diffusion (ED) unit 7012 subjects multivalued image data to error diffusion processing, thereby generating binary image data (or multivalued data) for each color. The generated binary (or multivalued) image data is stored in an ED buffer 7003. A work buffer 7004 stores print data corresponding to each of a plurality of printheads that discharge ink of respective colors. The thus created print data corresponding to each of the printheads is sent to the printer engine 3004 via a printer interface 7103, whereby the image represented by the print data is printed.

An overview of operation based upon the above arrangement will now be described.

<Ordinary Personal-Computer Printer Mode>

This is a printing mode in which an image is printed based upon print data sent from the personal computer 3010.

When data from the personal computer 3010 is input via a USB connector 1013 (see FIG. 3) in this mode, the data is sent directly to the printer engine 3004 via the USB hub 3008 and USB 3021 and printing is performed based upon the data from the personal computer 3010.

(Mode for Printing Directly from Memory Card>

When the memory card 3011 is inserted into or withdrawn from the card slot 1009, an interrupt is generated, in response to which the DSP 3002 is capable of sensing that that the memory card 3011 has been inserted or withdrawn (extracted). When the memory card 3011 is inserted, compressed (e.g., JPEG-compressed) image data that has been stored on the card is read in and stored in the memory 3003. The compressed image data is then decompressed and stored in the memory 3003 again. Next, if printing of the stored image data is designated using the control panel 1010, an RGB-to-YMCK signal conversion is performed, a gamma correction is applied and error diffusion processing, etc., is executed, the resultant data is converted to printable print data by the printer engine 3004 and the print data is output to the printer engine 3004 via the IEEE-1284-compliant interface 4002, whereby the image represented by the data is printed.

<Mode for Printing Direction from Camera>

Figure 6:
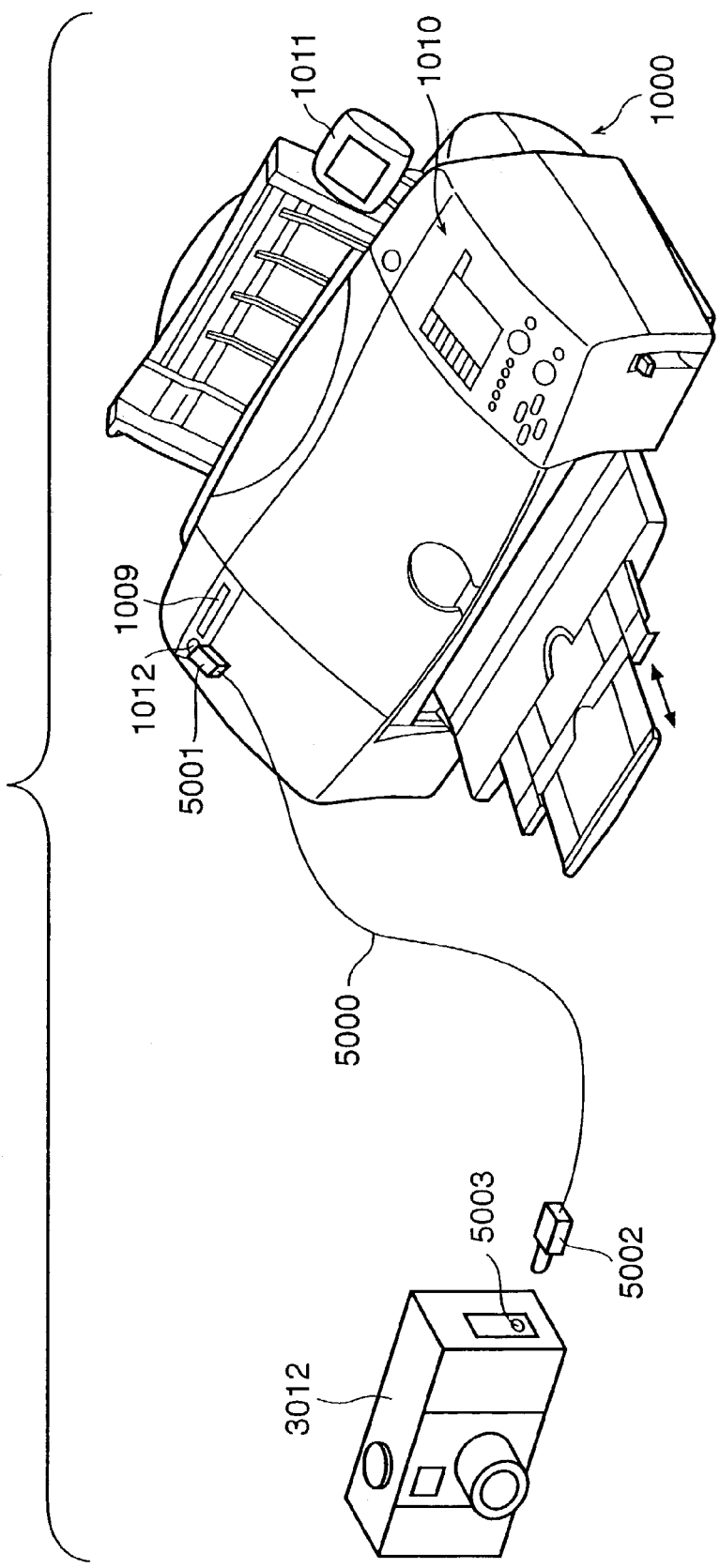
FIG. 6 depicts a diagram useful in describing the connection between a PD printer and a digital camera according to this embodiment.

FIG. 6 depicts a diagram useful in describing the connection between the PD printer 1000 and a digital still camera 3012 according to this embodiment.

As shown in FIG. 6, a cable 5000 has a connector 5001 that is connected to the USB terminal 1012 of the PD printer 1000 and a connector 5002 that is connected to a connection terminal 5003 on the digital still camera 3012. Further, the digital still camera 3012 is so adapted that image data being retained in an internal memory can be output via the connection terminal 5003. It should be noted that the digital still camera 3012 can be one having an internally provided memory as storage means or one equipped with a slot for loading a removable memory. By thus connecting the PD printer 1000 and digital still camera 3012 via the cable 5000 shown in FIG. 6, an image represented by image data from the digital still camera 3012 can be printed directly by the PD printer 1000.

In a case where the digital still camera 3012 has been connected to the PD printer 1000 as shown in FIG. 6, only a camera symbol is displayed on the display unit 1006 of the control panel 1010, the display on the control panel 1010 and the operation of the panel are rendered inoperative and so is the display on the viewer 1011. Accordingly, from this point onward, only operation of the keys on the digital still camera 3012 and display of images on the display unit (not shown) of the digital still camera 3012 are rendered effective. The user can therefore designate printing using the digital still camera 3012.

The characterizing feature of this embodiment will now be described.

Figure 7A:
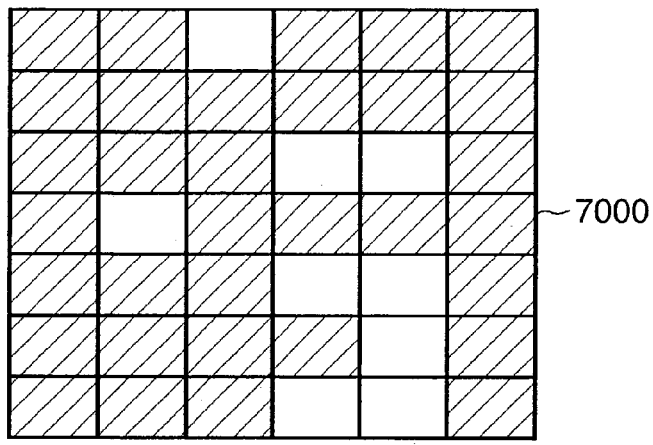
FIGS. 7A to 7C are diagrams useful in describing the structure of data in an input buffer according to this embodiment.
Figure 7B:
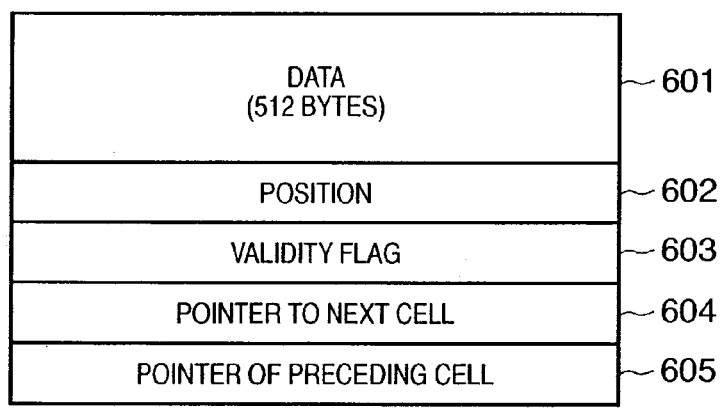
Figure 7C:
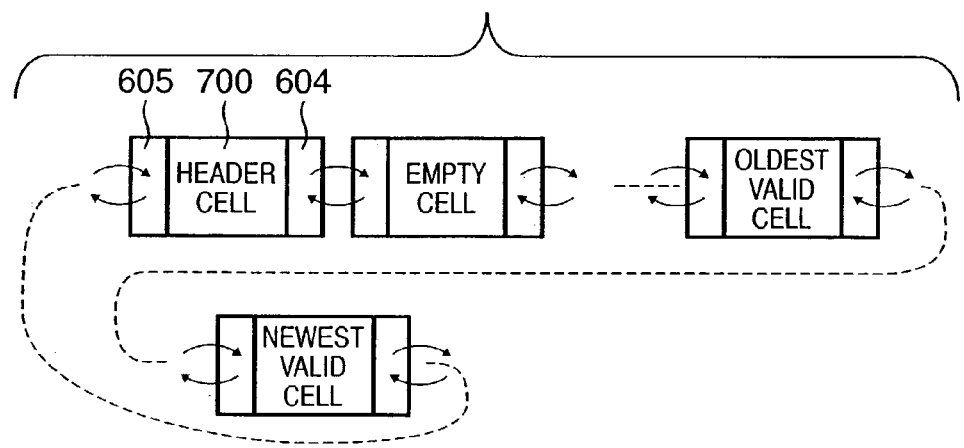

FIGS. 7A to 7C are diagrams useful in describing the structure of a memory area for storing image data contained in the input buffer 7000 that receives and stores the JPEG data from the digital still camera 3012. The input buffer 7000 stores the received JPEG data. When a request for JPEG image data is issued from the JPEG decoder 7006 in accordance with print processing, the JPEG image data corresponding to this request is supplied to the JPEG decoder 7006, where the data is decompressed. The JPEG image data thus decompressed is converted to RGB data and YMCK data corresponding to the print image, and the resulting data it output to the printer engine 3004 in sync with scanning of the printhead in the printer engine 3004, whereby the image represented by the image data is printed.

FIG. 7A is a conceptual view illustrating the memory structure of the input buffer 7000. The memory is divided into a plurality of cells (blocks) and the JPEG data is stored on a per-cell basis. In FIG. 7A, the hatched portion indicates cells (valid cells) in which valid JPEG data has been stored, and the white cells indicate cells (empty cells) in which valid JPEG data has not been stored.

FIG. 7B is a diagram useful in describing the data structure of each cell.

In FIG. 7B, data (512 bytes) 601, which is JPEG data, is stored in each cell. This embodiment will be described taking 512-byte data as an example. However, in a system to which the present invention is applicable, the number of data bytes is not limited to 512. Position information 602 indicates where (the byte number) in the original image file (JPEG file), the data 601 (which has been stored in the DSC 3012 or memory card 3011) is situated. A validity flag 603 indicates whether data in a cell is valid (flag ON) or not. A pointer 604 to a next cell indicates the cell that succeeds this cell. A pointer 605 of a previous cell indicates the immediately preceding cell linked to this cell. By defining the connection relationship among cells using such pointers, the cells of JPEG data of a single image file need not be physically adjoining in memory space. This makes it possible to utilize memory space effectively.

FIG. 7C is a diagram useful in describing the relationship among cells. Cells are logically related and connected in ring form in the following order: header cell 700→empty cell→valid cell [cell order: oldest (namely the cell in which data was stored first)→newest (namely the cell in which data was stored most recently]→header cell 700. Accordingly, valid cells are arrayed in order from oldest to newest. When there are no longer any empty cells, therefore, the oldest valid cell is changed to an empty cell and the newest acquired data can be stored in this empty cell. Further, an empty cell is placed immediately following the header cell 700. When new compressed image data is received, therefore, an empty cell for storing this compressed image data can be found immediately.

An overview of an exchange between the PD printer 1000 and digital still camera 3012 will now be described with reference to the flowchart of FIG. 8.

This processing is started by specifying an image file and then specifying the printing thereof in the DSC 3012. First, at step S1, the JPEG data of the specified image file is input from the DSC 3012 and stored in a prescribed memory area of the input buffer 7000. Depending upon the amount of data in the data file, there may be instances where not all of the compressed image data of the image file can be stored in the input buffer 7000. The processing of step S1 will be described later with reference to the flowchart of FIG. 9.

Step S1 is followed by step S2, at which the JPEG data is sent to the JPEG decoder 7006 and decompression of the JPEG data is specified. This is followed by step S3. When compressed data that has been stored in the input buffer 7000 is decompressed, it is determined at step S3 whether print data (image data) equivalent to a single scan of the printhead of printer engine 3004 can be produced or not. If such print data can be produced, control proceeds to step S6, at which the JPEG data is decompressed to develop a single main scan's worth of image data. Control then proceeds to step S7, at which a single main scan of print processing is executed, and then to step S8, at which it is determined whether print processing of this image file has been completed or not. If processing has not been completed, control returns to step S2, at which processing for expanding the compressed data of the next main scan is executed.

If it is found at step S3 that a single main scan's worth of print data (image data) cannot be generated, control proceeds to step S4. Here the DSC 3012 is requested for JPEG data. The compressed data sent in response to this request is received and stored in the input buffer 7000 at step S5. Control then proceeds to step S2, at which the compressed data is decoded. If image data printed in one main scan is generated at step S3, control proceeds to print processing.

Figure 8:
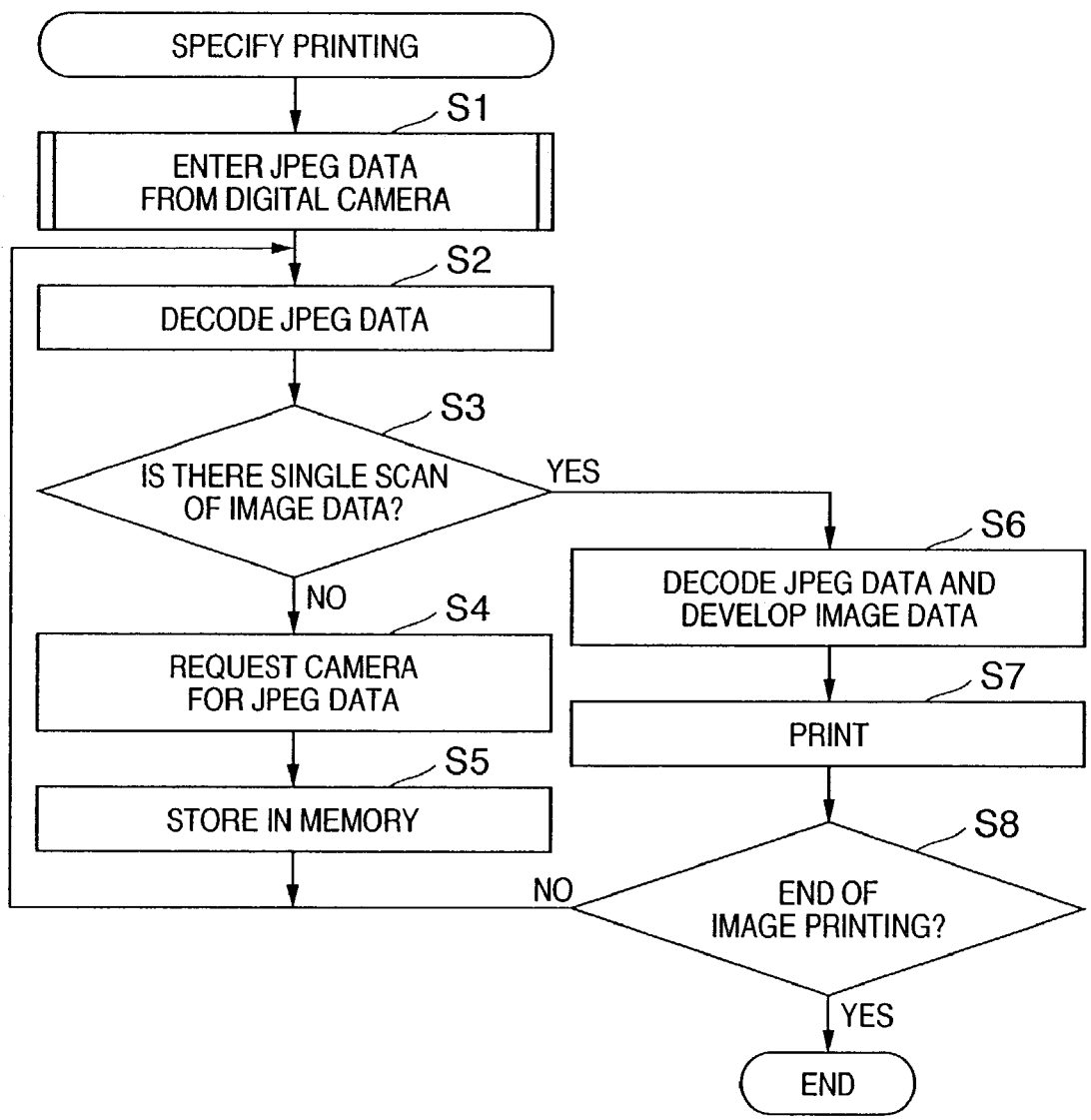
FIG. 8 is a flowchart for describing an overview of processing executed in a PD printer to acquire data from a digital camera according to this embodiment.
Figure 9:
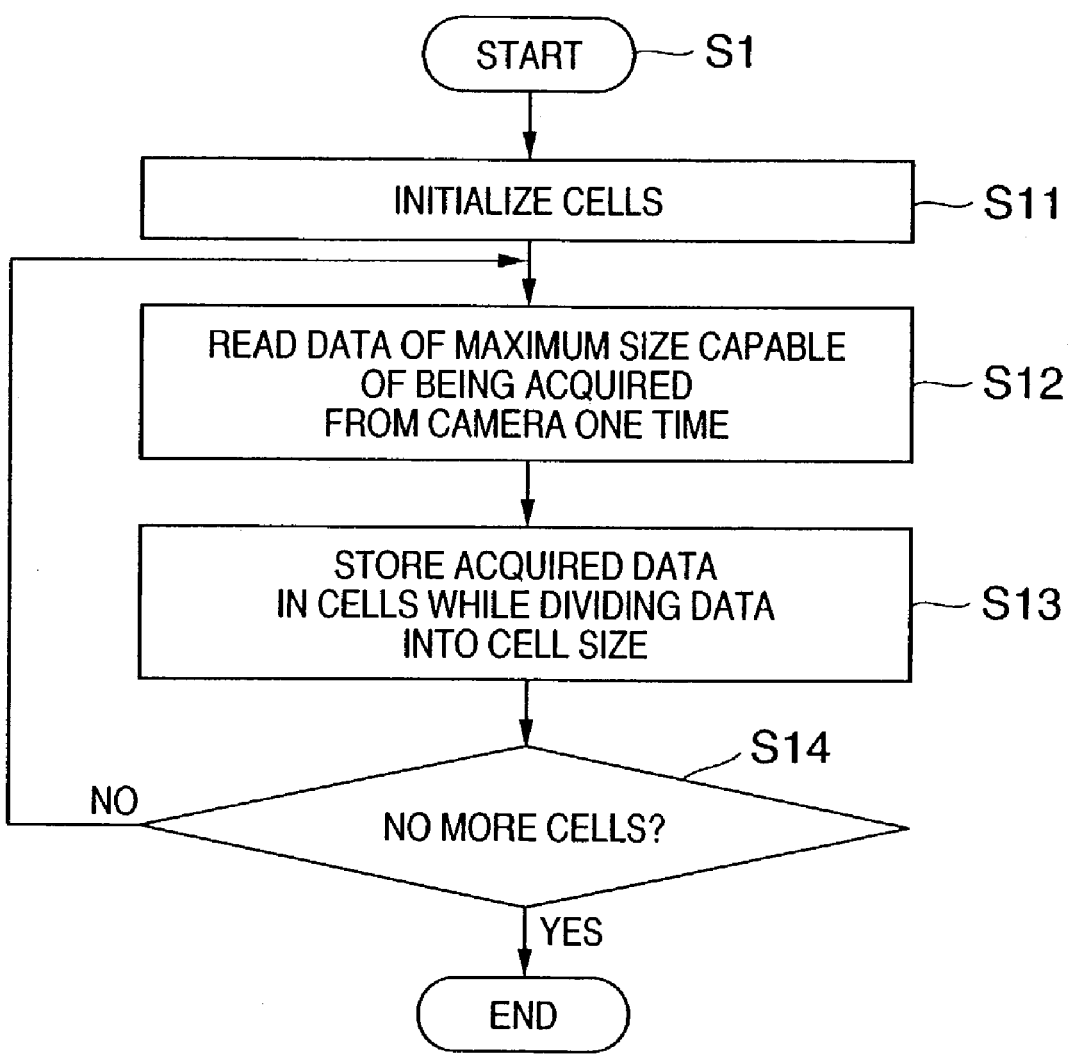
FIG. 9 is a flowchart illustrating processing for inputting JPEG data from a camera at step S1 in FIG. 8.

FIG. 9 is a flowchart illustrating processing for inputting JPEG data from the DSC 3012 at step S1 in FIG. 8.

First, at step S11, the data in each cell (FIG. 7A) of the image data storage area of input buffer 7000 is initialized (cleared). Control then proceeds to step S12, at which the DSC 3012 is requested for JPEG data of the maximum size that can be acquired from the DSC 3012. This data is received. Next, at step S13, the received JPEG data is loaded into the input buffer 7000 cell by cell. This processing is executed repeatedly until it is confirmed at step S14 that empty cells no longer remain in the input buffer 7000.

This processing will be described with reference to FIGS. 7A to 7C. Initially, all cells in the input buffer 7000 are in the cleared state in FIG. 7A. JPEG data is stored in the empty cells 512 bytes at a time in the order in which the data is received. Cells are linked to each other by the pointers of each cell, from the oldest valid cell to the newest valid cell, in the order in which the cells are stored. In a state in which empty cells no longer remain, the oldest cell among the valid cells is positioned immediately following the header cell 700. It should be noted that this linking of the cells is strictly conceptual and does not indicate a physical ordering of positions.

Figure 10:
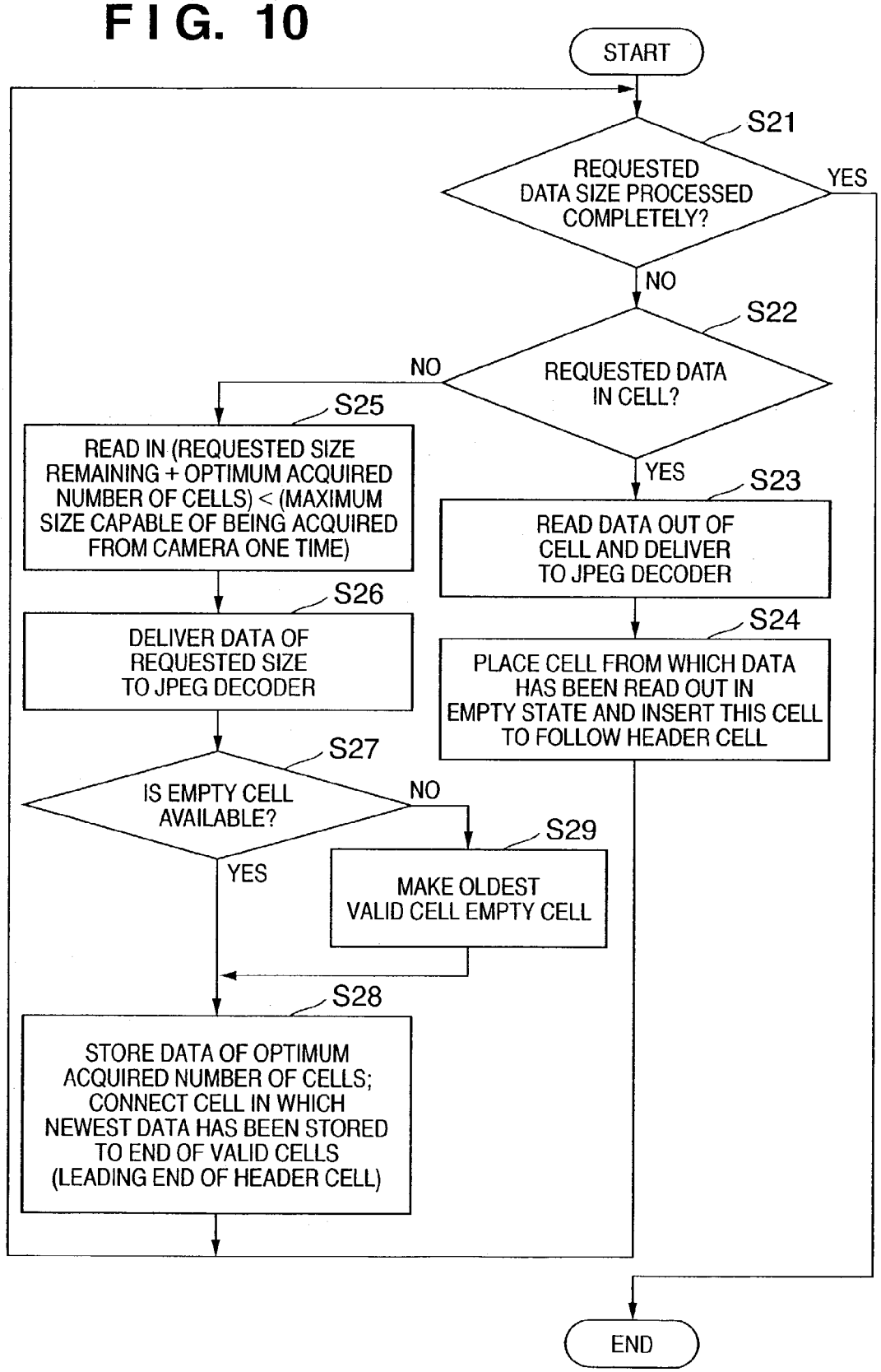
FIG. 10 is a flowchart for describing buffering processing by an input buffer according to this embodiment.
Figure 11:
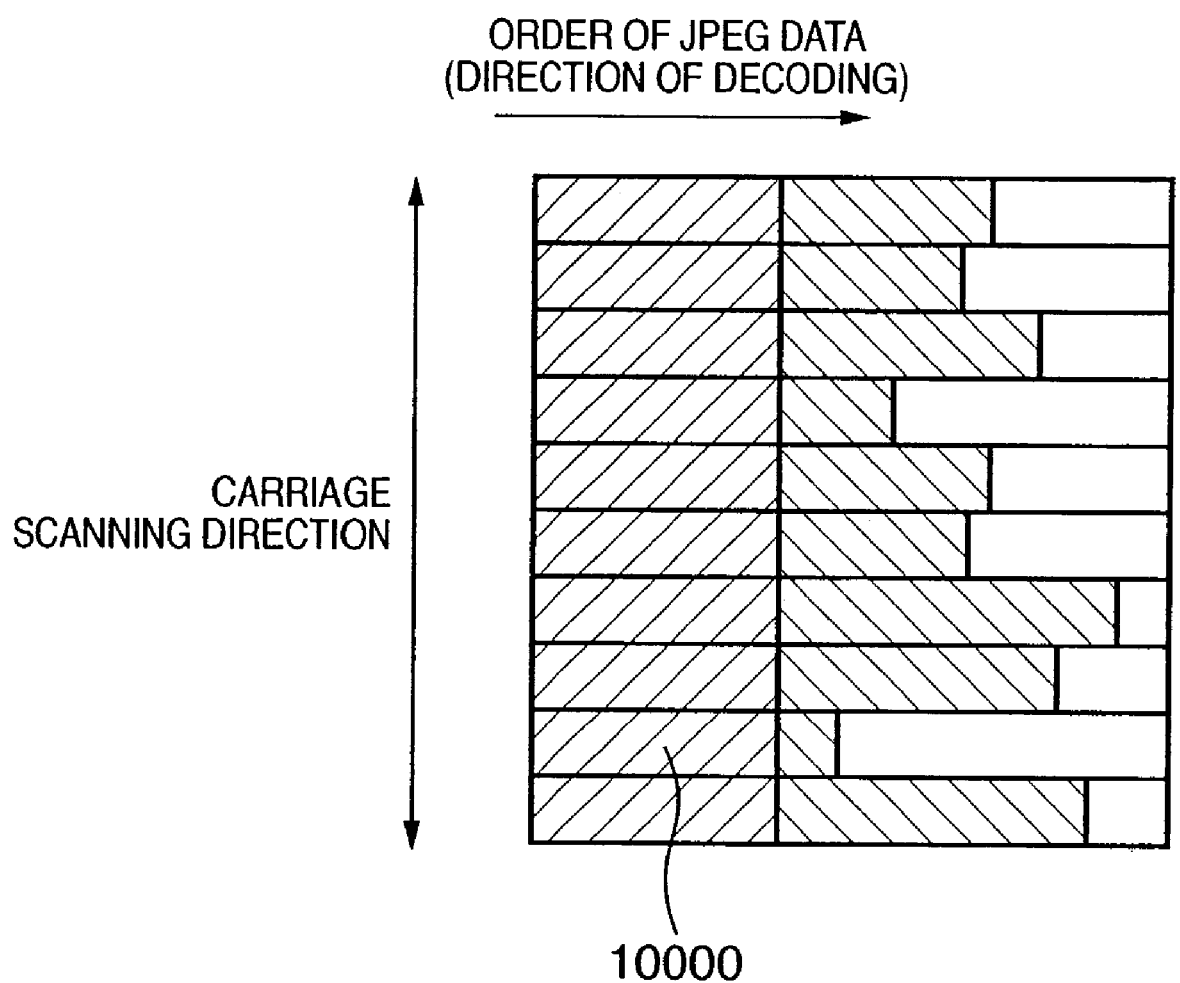
FIG. 11 is a diagram useful in describing a problem encountered in the prior art.
Figure 12:
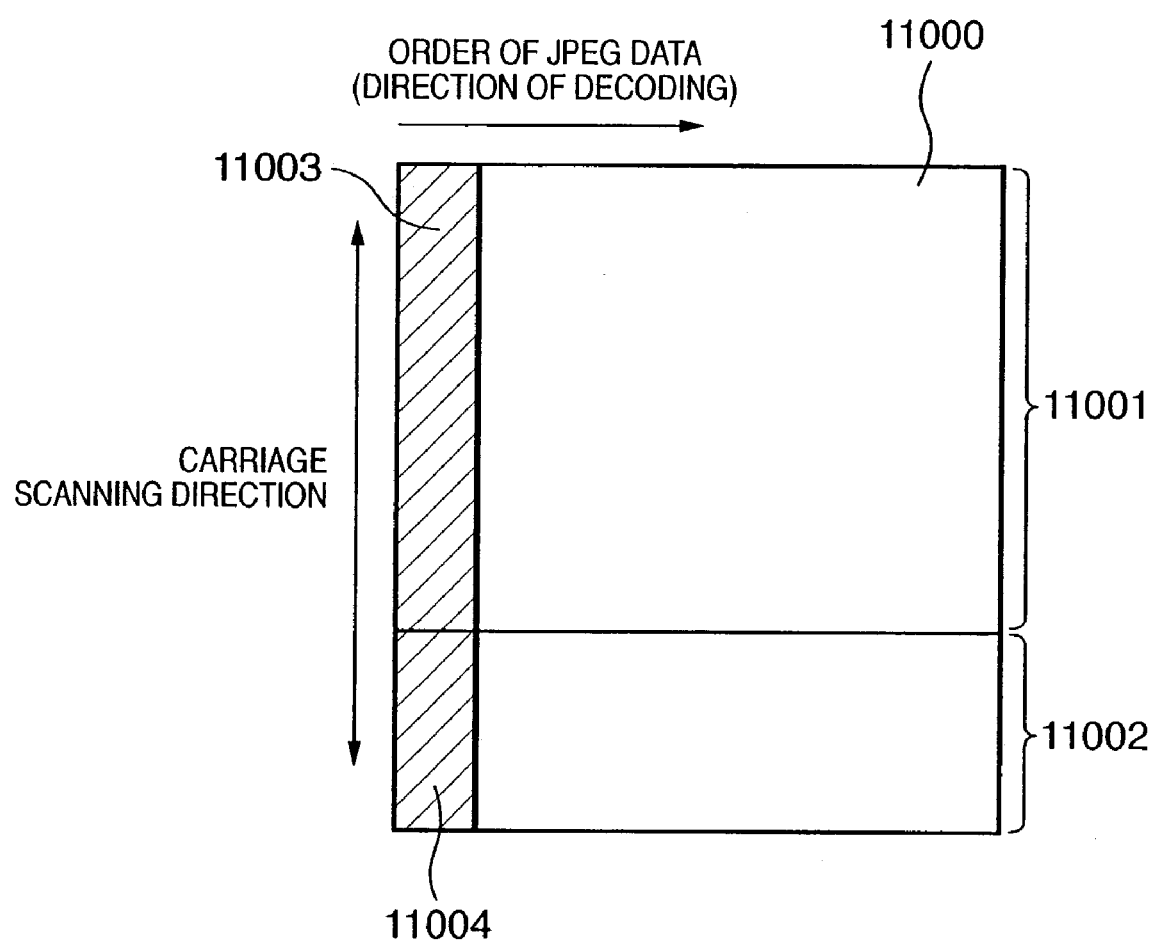
FIG. 12 is a diagram useful in describing the problem encountered in the prior art.

The processing of steps S3 to S5 in FIG. 8 will now be described in detail with reference to the flowchart of FIG. 10.

First, at step S21, image data in an amount printed by the next main scan is supplied to the JPEG decoder 7006 and it is determined whether all of the JPEG data requested by the JPEG decoder 7006 has been processed. If all of the JPEG data has been processed, no further processing is necessary and processing is quit directly.

If all of the JPEG data has not been processed, i.e., if a next item of JPEG data is being requested by the JPEG decoder 7006, then control proceeds to step S22, at which it is determined whether the requested JPEG data has already been stored in any cell of the input buffer 7000. Specifically, since the JPEG data required next is specified by the JPEG decoder 7006, the data of the cell corresponding to this is found by referring to the position information 602 of this cell. When JPEG data thus requested has been stored in a cell, control proceeds to step S23. Here the JPEG data is read out of this cell and supplied to the JPEG decoder 7006. Control then proceeds to step S24, at which the validity flag 603 of the cell from which the JPEG data has been read out is turned off to indicate the data has been used, thereby rendering this cell an empty cell. This empty cell is then positioned to immediately follow the header cell 700 shown in FIG. 7C. Specifically, the pointer 604 to the cell that follows the header cell 700 is made the starting position of this empty cell, the pointer 605 of the cell preceding this empty cell is made a value that designates the tail end of the header cell, and the pointer 604 to the cell that follows this empty cell is changed to the starting position of the previous empty cell or, if there is no other empty cell, to a value that designates the start of the oldest valid cell. It goes without saying that pointers 604, 605 of valid cells or empty cells before and after a cell that has been changed from a valid cell to an empty cell also are changed in a similar manner.

As a result of the foregoing, JPEG data that has already been stored in the input buffer 7000 is decoded and expanded into an image and a cell in which this JPEG data has been stored can be released by this decoding.

On the other hand, when it is determined at step S22 that the JPEG data requested by the JPEG decoder 7006 has not been stored in any cell of the input buffer 7000, control proceeds to step S25 and the DSC 3012 must be requested for JPEG data. Since requesting the DSC 3012 only for the amount of JPEG data requested by the JPEG decoder 7006 is not efficient, JPEG data equivalent to a further several cells (an optimum acquired number of cells) is requested. As for the optimum acquired number of cells, a requisite condition is that the total value of (amount of JPEG data requested by JPEG decoder 7006)+(optimum acquired number of cells) be less than the amount of JPEG data (one packet's worth) that can be acquired at one time from the DSC 3012. Here the optimum acquired number of cells can be found by the following calculation:

weighting=(file size)/(receive-buffer size)

Calculate ratio of file size to receive-buffer size size in the vicinity of one MCU line=(file size)/(number of MCUs×cell data size)

Calculate how much data will fit in one MCU line optimum acquisition quantity=[(size in the vicinity of one MCU line)/weighting]×cell data size Calculate acquisition size per MCU line When JPEG data transmitted from the DSC 3012 in accordance with requested amount of data is received, control proceeds to step S26, at which the JPEG data of the amount requested by the JPEG decoder 7006 is supplied to the JPEG decoder 7006. This is followed by step S27. Here, in order to store the JPEG data requested superfluously from the DSC 3012 (namely the data of the optimum acquired number of cells) in the input buffer 7000, it is determined whether the input buffer 7000 has enough empty cells to store the JPEG data of the amount equivalent to the optimum acquired number of cells. If there are enough empty cells, control proceeds to step S28. Here the JPEG data of the amount equivalent to the optimum acquired number of cells is stored in the empty cells, the cells in which JPEG data has been stored anew are made valid cells and these cells are positioned to follow the newest valid cell (to precede the header cell 700) shown in FIG. 7C.

If enough cells to store the JPEG data of the amount equivalent to the optimum acquired number of cells do not reside in the input buffer 7000, then control proceeds to step S29. Here the necessary number of cells [(number of optimum acquired cells)–(number of already existing empty cells)] from the oldest cell among the valid cells (namely the valid cell nearest to the header cell 700 logically speaking) are changed to empty cells. As a result, data for the JPEG data of the amount equivalent to the optimum acquired number of cells is reserved in consecutive empty cells in FIG. 7C. At step S28, the JPEG data of the amount equivalent to the optimum acquired number of cells can be stored in the cells.

Thus, the memory area of the input buffer (memory) 7000 is used efficiently so that the number of times JPEG data is acquired from DSC 3012 is reduced, thereby making it possible to shorten the time needed to acquire and print JPEG data from the DSC 3012.

Further, an increase in the time needed for printing can be prevented while limiting the memory capacity for storing data acquired from the DSC 3012.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the invention is attained also by supplying a storage medium (or recording medium) on which the program codes of the software for performing the functions of the foregoing embodiment (processing executed on the side of the camera and various print processing executed on the side of the printer) to a system or an apparatus have been recorded, reading the program codes with a computer (e.g., a CPU or MPU) of the system or apparatus from the storage medium, and then executing the program codes. In this case, the program codes read from the storage medium themselves implement the novel functions of the embodiment, and the program codes per se and storage medium storing the program codes constitute the invention. Further, besides the case where the aforesaid functions according to the embodiment are implemented by executing the program codes read by a computer, it goes without saying that the present invention covers a case where an operating system or the like running on the computer performs a part of or the entire process based upon the designation of program codes and implements the functions according to the embodiment.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process based upon the designation of program codes and implements the function of the above embodiment.

The present invention is not limited to the above embodiments and various changes and modifications can be made within the spirit and scope of the present invention. Therefore, to apprise the public of the scope of the present invention, the following claims are made.

What is claimed is:

1. An ink-jet printing apparatus for scanning an ink-jet head having plural nozzles for emitting ink onto a recording medium in a main scanning direction and for receiving compressed image data from an image sensing device to print, comprising:
   a memory divided into a plurality of blocks, configured to store the received compressed image data on a block-by-block basis;
   an expansion unit configured to expand the compressed image data stored in the memory into image data necessary for the printing operation by the ink-jet head;
   a determination unit configured to determine whether compressed image data corresponding to image data for the printing operation of one scanning of the ink-jet head, to be expanded by said expansion unit, is stored in the memory; and
   a requesting unit adapted to request the image sensing device for compressed image data,
   wherein said request unit requests the image sensing device for an amount of compressed image data more than a differential amount between the amount of compressed image data stored in said memory and the amount of compressed image data corresponding to the image data for the printing operation of one scanning, in a case where it has been determined by said determination unit that compressed image data corresponding to the image data for the printing operation of one scanning is not stored in said memory.

2. The apparatus according to claim 1, wherein each of the plurality of blocks includes pointers that point to at least a data area, a data position in the compressed image data and logically linked blocks on both sides.

3. The apparatus according to claim 1, wherein if an empty block for storing received compressed image data does not exist in said memory, then said memory is controlled to store the received compressed image data in a block in which compressed image data was earliest stored.

4. A method of controlling printing of an image in an ink-jet printing apparatus for scanning and ink-jet head having plural nozzles for emitting ink onto a recording medium in a main scanning direction, and for receiving compressed image data from an image sensing device to print, comprising:
   a storage control step of dividing the area of a memory into a plurality of blocks and storing the received compressed image data in the memory on a block-by-block basis;
   an expansion step of expanding the compressed image data stored in the memory into image data being necessary for printing operation by the ink-jet head;
   a determination step of determining whether compressed image data corresponding to image data for printing operation of one scanning of the ink-jet head, is stored in the memory; and
   a requesting step of requesting the image sensing device for an amount of compressed image data more than a differential amount between the amount of compressed image data stored in said memory and the amount of compressed image data corresponding to the image data for the printing operation of one scanning, in a case where it is determined in said determination step that compressed image corresponding to the image data for the printing operation of one scanning is not stored in the memory.

5. The method according to claim 4, wherein each of the plurality of blocks includes pointers that point to at least a data area, a data position in the compressed image data and logically linked blocks on both sides.

6. The method according to claim 4, wherein if an empty block for storing received compressed image data does not exist in the memory, then the memory is controlled to store the received compressed image data in a block in which compressed image data was earliest stored.

7. An ink-jet printing apparatus for scanning an ink-jet head having plural nozzles for emitting ink onto a recording medium in a main scanning direction, and for receiving compressed image data from an image sensing device to print, comprising:
   a memory divided into a plurality of blocks, configured to store the received compressed image data on a block-by-block basis;
   an expansion unit configured to expand the compressed image data stored in the memory into image data being necessary for the printing operation by the ink-jet head;
   a determination unit configured to determine whether compressed image data corresponding to image data for the printing operation of one scanning of the ink-jet head, to be expanded by said expansion unit, is stored in the memory;
   a requesting unit configured to request the image sensing device for compressed image data, an amount of the compressed image data more than a differential amount between the amount of compressed image data stored in said memory and the amount of compressed image data corresponding to the image data for the printing operation of one scanning, in a case where said determination unit has determined that the compressed image data corresponding to the image data for the printing operation of one scanning is not stored in the memory; and
   a unit configured to delete compressed image data of a block in which received compressed image data was earliest stored from among the plurality of blocks, and store the received compressed image data in the block from which the data was erased, and change the logical connection relationship of the plurality of blocks, in a case where an empty cell does not exist in the memory when the received compressed image data is stored in the memory.

8. The apparatus according to claim 7, wherein each of the plurality of blocks includes pointers for pointing to blocks, which store compressed image data, situated before and after compressed image data that has been stored.

9. The apparatus according to claim 8, wherein the plurality of blocks are linked logically using the pointers.

10. A method of controlling printing of an image in an ink-jet printing apparatus for scanning an ink-jet head having plural nozzles for emitting ink onto a recording medium in a main scanning direction, and for receiving compressed image data from an image sensing device to print, comprising:

a storage control step of dividing the area of a memory into a plurality of blocks and storing the received compressed image data in the memory on a block-by-block basis;

an expansion step of decompressing the compressed image data that has been stored in the memory, and expanding the data into image data necessary for the printing operation by the ink-jet head;

a determination step of determining whether compressed image data corresponding to image data for the printing operation of one scanning of the ink-jet head, to be expanded in said expansion step, is stored in the memory;

a requesting step of requesting the image sensing device for compressed image data an amount of compressed image data more than a differential amount between the amount of compressed image data stored in said memory and the amount of compressed image data corresponding to the image data for the printing operation of one scanning, in a case where it is determined in said determination step that the compressed image data corresponding to the image data for the printing operation of one scanning is not stored in the memory; and a step of deleting compressed image data of a block in which received compressed image data was earliest stored from among the plurality of blocks, storing the received compressed image data in the block from which the data was erased, and changing the logical connection relationship of the plurality of blocks, in a case where an empty cell does not exist in the memory when the received compressed image data is stored in the memory.

11. The method according to claim 10, wherein each of the plurality of blocks includes pointers for pointing to blocks, which store compressed image data, situated before and after compressed image data that has been stored.

12. The method according to claim 11, wherein the plurality of blocks are linked logically using the pointers.

* * * * *

UNITED STATES PATENT AND TRADEMARK OFFICE
CERTIFICATE OF CORRECTION

PATENT NO. : 7,274,478 B2
APPLICATION NO. : 10/444991
DATED : September 25, 2007
INVENTOR(S) : Oshima et al.

It is certified that error appears in the above-identified patent and that said Letters Patent is hereby corrected as shown below:

COVER PAGE,
Item (73) Assignee, "CanonKabushiki Kaisha, Tokyo (JP)" should read -- Canon Kabushiki Kaisha, Tokyo (JP) --.

COLUMN 4:
Line 9, "By detected" should read -- By detecting --; and
Line 45, "to be printing" should read -- to be printed --.

COLUMN 6:
Line 46, "that" should be deleted.

COLUMN 7:
Line 35, "it output" should read -- is output --.

COLUMN 13:
Line 15, "an amount" should read -- in an amount --.

Signed and Sealed this

Twentieth Day of May, 2008

JON W. DUDAS
*Director of the United States Patent and Trademark Office*